March 26, 1963
N. E. KLEIN
3,082,734
APPARATUS FOR COATING A MOVING WEB
Filed Dec. 8, 1958
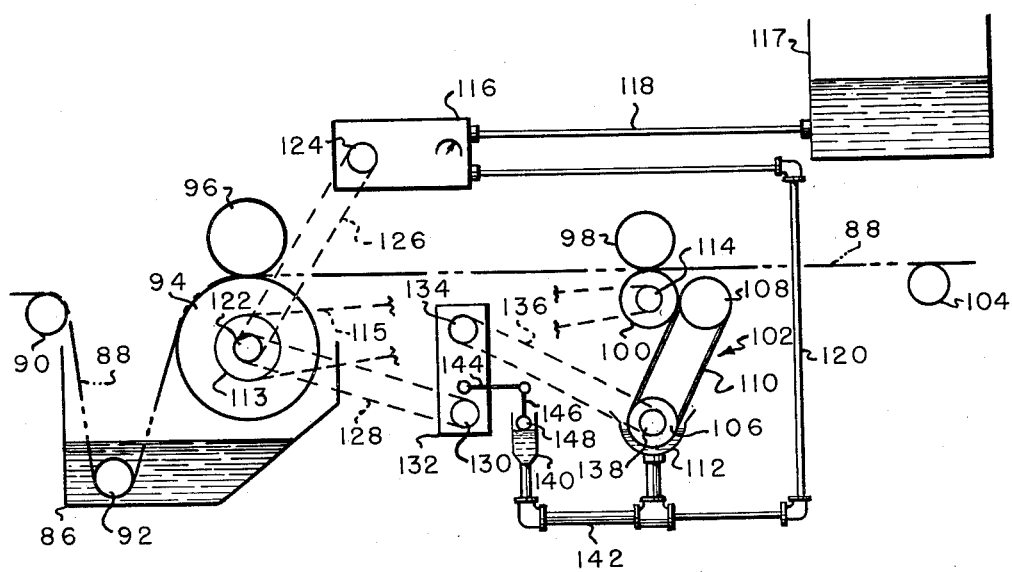
INVENTOR.
NORMAN E. KLEIN
BY 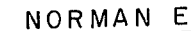
ATTORNEY

3,082,734
APPARATUS FOR COATING A MOVING WEB
Norman E. Klein, Pendleton, S.C., assignor to Deering Milliken Research Corporation, Pendleton, S.C., a corporation of Delaware
Filed Dec. 8, 1958, Ser. No. 778,727
5 Claims. (Cl. 118—7)

This invention relates to methods and apparatus for uniformly distributing upon a moving web relatively small but precisely determined quantities of a liquid.

In numerous instances, for example, in the textile and paper fields, it is desirable to evenly distribute a precise relatively small quantity of a liquid reagent upon the surface of a moving web, but prior to this invention there has been no adequate method or apparatus for performing this operation. One type of apparatus which is presently employed for applying relatively small quantities of a liquid reagent to a moving web comprises a roll having its lower peripheral surface in contact with a supply of the reagent and means to guide the moving web into contact with the upper peripheral surface of the roll. Such apparatus is generally considered to be excellent from the standpoint of evenly distributing the liquid upon the web but has the disadvantage that the amount of liquid applied fluctuates materially with small changes in process variables, and the disadvantage that it is impossible to readily determine how much of the liquid is being applied. Even if one weighs a length of the web before and after it is passed in contact with the roll, one obtains only an approximation as to the amount of liquid applied since normally a portion of the liquid is evaporated from the surface of the web before it is collected, and in instances where two liquids are being simultaneously applied, it is completely impossible to accurately estimate the proportions of each being applied to the web at any particular time.

According to this invention, there is provided apparatus which enables one to precisely meter a selected volume or weight of liquid upon each unit length of a web and to distribute the same evenly over the surface of the web. Apparatus according to this invention comprises a reservoir, such as a pan or the like, for holding a relatively small and temporary supply of the liquid to be applied, and a rotating member, such as an applicator roll, in contact with the liquid in the reservoir. Means are then provided for transferring, either directly or indirectly, the film of liquid adhering to the rotating member to the web material being processed and by this means even distribution of the liquid upon the web is achieved. The apparatus also includes means to rereplenish the supply of liquid in the reservoir at a constant rate relative to the rate of movement of the web and since, for reasons which will subsequently be explained, the instantaneous rate at which the liquid is applied depends upon the liquid level in the reservoir, the liquid level in the reservoir adjusts itself, within limits, such that the rate at which liquid is removed from the reservoir by the rotating member is exactly equal to the rate at which the liquid in the reservoir is replenished. There is, therefore, evenly distributed upon the surface of each unit length of the web a precise amount of the liquid.

An embodiment of the invention will now be described with reference to the accompanying drawing in which:

The drawing is a schematic view of apparatus according to this invention embodying a single applicator roll.

The drawing illustrates a type of apparatus in which an indirect type of applicator system is employed and the rate of operation of the applicator system is automatically regulated. There is illustrated a conventional pad box 86 which can, if desired, be employed to apply a first liquid reagent to a running length of fabric 88 which passes over a guide roll 90 and under an immersion roll 92 disposed within the pad box 86. From the roll 92, the fabric 88 passes between a pair of squeeze rolls 94 and 96 which, in this instance, also serve as metering rolls, and between a press roll 98 and a transfer roll 100. The rolls 98 and 100 are component parts of an applicator system which is generally indicated by the reference numeral 102 and which will subsequently be described in greater detail. The fabric 88 thereafter passes about a guide roll 104 to a conventional take-up means, not illustrated.

The applicator system 102, in addition to the rolls 98 and 100, includes a driven roll 106, an idler roll 108, and a belt 110 running about the rolls 106 and 108. The bottom portion of roll 106 is disposed within a close fitting pan 112 which serves as a reservoir for a small temporary supply of the liquid to be applied to fabric 88. The revolving surface of belt 110 operatively contacts the liquid in pan 112 and liquid is transported by film adhesion to transfer roll 100 which wipes the liquid film from the revolving surface of belt 110 and evenly distributes the same upon fabric 88. Means, including a sprocket 113 secured for rotation with roll 94, a sprocket 114 carried by roll 100 and a chain 115 running about sprockets 113 and 114, is provided for driving roll 100 such that it has a surface speed equal to the linear rate of movement of fabric 88 and this arrangement has the advantage that there is no abrasion of the fabric as a result of its contact with the roll utilized for application of the liquid to the fabric.

Since pan 112 is intended to hold only a temporary supply of the liquid to be applied, the liquid in pan 112 must be continuously replenished and this is accomplished by means of a metering pump 116 which supplies liquid from a large liquid supply container 117 to pan 112 through conduits 118 and 120. Preferably the supply container 117 is disposed at higher level than pan 112 so that an initial supply of liquid can be introduced into pan 112 by gravity flow before the apparatus is placed in operation.

As illustrated, both the metering pump 116 and roll 106 are driven from metering roll 94. The driving means for pump 116 comprises a double sprocket 122 secured for rotation with roll 94, a sprocket 124 secured to the drive shaft of pump 116, and a sprocket chain 126 running about sprockets 122 and 124. The drive means for roll 106, in addition to the double sprocket 122, includes a sprocket chain 128 running about sprocket 122 and a sprocket 130 secured to the drive shaft of a variable rate drive mechanism 132 which can be of any conventional design and construction. The output shaft of the variable drive mechanism 132 is geared to roll 106 by means of a sprocket 134, a sprocket chain 136, and a sprocket 138 secured for rotation with roll 106.

Control of the variable speed drive mechanism 132 is achieved automatically by means of a float system which includes an upstanding cylindrical container 140 connected to pan 112 by means of a conduit 142. A control lever 144 for controlling the speed ratio of sprockets 130 and 134 extends over the open upper end of cylindrical container 140 and a rod member 146 carrying a float 148 extends into container 140 such that float 148 rests upon the surface of the liquid therein. As the liquid level rises in pan 112 and container 140, the lever 144 is pivoted by means of float 148 to change the speed ratio of sprockets 130 and 134 such that the rate of rotation of roll 106 and belt 110 increases relative to the rate of operation of metering pump 116, and if the liquid level in container 140 decreases, the rate of rotation of roll 106 and belt 110 relative to the rate of operation of metering pump 116 decreases correspondingly.

The float control arrangement described above increases the criticality of the liquid level in pan 112, but the equilibrium rate at which the liquid is applied to fabric 88 is determined solely by the rate at which the liquid is supplied by the metering pump. The rate of rotation of the applicator roll or the equivalent and the rate of cloth movement is mechanically synchronous and proportional except for ratio-rate changes between the two effected by operation of the variable speed unit, and when a change is made in reagent application percentage on cloth weight, the central system basically alters this ratio so that a new control relationship is automatically established and manual adjustment of the rate of operation of the applicator system is unnecessary. The float control system also eliminates the necessity for an overflow arrangement for the applicator pan in most instances although, if desired, the apparatus can be provided with an overflow arrangement to take care of emergencies such as, for example, the fabric supply becoming depleted in an unattended machine.

Having thus described my invention, what I desire to claim and secure by Letters Patent is:

1. Apparatus for processing a running length of web material comprising first and second reservoirs for holding quantities of liquids, means comprising immersion and squeeze rolls for impregnating said web with liquid maintained in said first reservoir, means for supplying liquid to said second reservoir at a rate dependent upon the rate of movement of said web material, transferring means for contacting said liquid in said second reservoir and to transport said liquid by film adhesion transversely to said web material impregnated with liquid from said first reservoir, said transferring means including a variably driven roll having external dimensions closely corresponding to the internal configuration of said second reservoir to produce a relatively large change in the level of said liquid maintained in said second reservoir as a result of a small change in the quantity of said liquid in said second reservoir, and means to measure the amount of liquid in said second reservoir and to automatically control the rate of rotation of said variably driven roll in response to small variations in the amount of said liquid in said second reservoir such that, with said second reservoir substantially full of liquid, said liquid is transferred from said reservoir to said web material by said transferring means at a rate in excess of that which said liquid is supplied to said second reservoir by an increase in the rate of said rotation of said variably driven roll, and such that, with said second reservoir substantially empty, said liquid is transferred from said reservoir to said web material by said transferring means at a rate less than at which it is supplied to said second reservoir by a decrease in said rate of rotation of said roll.

2. Apparatus according to claim 1 wherein said measuring means comprises a float system to measure the liquid level in said reservoir.

3. Apparatus according to claim 2 wherein said float system comprises an upstanding cylindrical container connected to the bottom of said reservoir by means of a conduit, a float arranged to rest upon the surface of liquid contained in said container, pivotally mounted connecting means attached at one end to said float and operatively connected at the other end to said variable rate driving means for said applicator roll.

4. Apparatus for processing a running length of web material comprising a first roll member, a reservoir with an internal configuration closely corresponding to a bottom portion of said roll member and so disposed that the lower periphery of said roll member is operatively in contact with a supply of liquid in said reservoir, a second roll member spaced from said first roll member, a belt circumscribing said first and second roll members, a liquid transfer roll in contact with said belt, means for guiding said web material into contact with the periphery of said liquid transfer roll, a metering pump for delivering liquid to said reservoir, means for operatively driving said metering pump at a fixed rate with respect to the rate of movement of said web material, means to drive said belt at a rate such that, with said reservoir full of liquid, liquid is operatively transferred to said transfer roll at a rate in excess of that at which it is supplied to said reservoir and such that, with said reservoir substantially empty, liquid is transferred to said transfer roll at a rate less than that at which it is supplied to said reservoir, and means to drive said transfer roll such that it has a surface speed substantially equal to the linear rate of movement of said web material in contact therewith.

5. Apparatus for treating a running length of web material comprising first and second roll members in spaced relationship to each other, belt means circumscribing said first and second roll members, a reservoir for operatively holding a supply of liquid in contact with said belt member, a transfer roll remote from said reservoir and in surface contact with said belt member, guide means to guide said web material into contact with said transfer roll, means to drive said transfer roll with a surface speed substantially equal to the linear rate of movement of said web material, and means to drive said belt member with a surface speed different from that of the surface speed of said transfer roll.

References Cited in the file of this patent

UNITED STATES PATENTS

| Number | Name | Date |
|---|---|---|
| 348,375 | Bechly | Aug. 31, 1886 |
| 410,810 | Sparks | Sept. 10, 1889 |
| 2,002,379 | Thomas | May 21, 1935 |
| 2,075,620 | Mackenzie | Mar. 30, 1937 |
| 2,227,998 | Van Derhoef | Jan. 7, 1941 |
| 2,279,553 | Bradt | Apr. 14, 1942 |
| 2,289,686 | Sooy | July 14, 1942 |
| 2,345,179 | Close et al. | Mar. 28, 1944 |
| 2,415,644 | Leonhard et al. | Feb. 11, 1947 |
| 2,556,032 | Faeber | June 5, 1951 |
| 2,583,267 | Jones et al. | Jan. 22, 1952 |
| 2,658,471 | Bledsoe | Nov. 10, 1953 |
| 2,694,963 | MacDonald | Nov. 23, 1954 |
| 2,704,530 | Nilsen et al. | Mar. 22, 1955 |
| 2,827,873 | Thorn | Mar. 25, 1958 |
| 2,859,133 | Olscott | Nov. 4, 1958 |
| 2,887,087 | Jones | May 19, 1959 |
| 2,981,638 | Jones | Apr. 25, 1961 |